(12) United States Patent
Barade et al.

(10) Patent No.: US 11,661,041 B2
(45) Date of Patent: May 30, 2023

(54) PARKING BRAKE APPARATUS FOR A VEHICLE

(71) Applicant: Bendix Commercial Vehicle Systems LLC, Elyria, OH (US)

(72) Inventors: Girish Barade, Chandler, AZ (US); Christopher H Hutchins, Bay Village, OH (US); Meviltan Mendis, Pune (IN); Thomas J Weed, North Ridgeville, OH (US)

(*) Notice: Subject to any disclaimer, the term of this patent is extended or adjusted under 35 U.S.C. 154(b) by 435 days.

(21) Appl. No.: 16/944,688

(22) Filed: Jul. 31, 2020

(65) Prior Publication Data

US 2022/0032887 A1   Feb. 3, 2022

(51) Int. Cl.
  *B60T 8/17*   (2006.01)
  *B60T 7/20*   (2006.01)
  *B60T 13/66*   (2006.01)
  *B60T 13/68*   (2006.01)

(52) U.S. Cl.
  CPC ............ *B60T 8/1708* (2013.01); *B60T 7/20* (2013.01); *B60T 13/662* (2013.01); *B60T 13/683* (2013.01)

(58) Field of Classification Search
  CPC .... B60T 8/1708; B60T 13/662; B60T 13/683; B60T 7/042; B60T 2220/02
  See application file for complete search history.

(56) References Cited

U.S. PATENT DOCUMENTS

| | | | |
|---|---|---|---|
| 6,406,102 B1 | 6/2002 | Arnold | |
| 7,690,735 B2 * | 4/2010 | Bennett | ................. B60T 13/662 |
| | | | 303/9.66 |
| 10,118,597 B2 | 11/2018 | Taneyhill | |
| 2007/0249465 A1 * | 10/2007 | Barber | ................. B60T 13/746 |
| | | | 477/197 |
| 2011/0022283 A1 | 1/2011 | Lovell | |
| 2018/0162413 A1 * | 6/2018 | Theodosiou | ............ E02F 9/268 |
| 2020/0180585 A1 | 6/2020 | Barade | |
| 2020/0180586 A1 | 6/2020 | Taneyhill | |

FOREIGN PATENT DOCUMENTS

DE   102005031725 A1   1/2007

OTHER PUBLICATIONS

Bendix Commercial Vehicle Systems LLC, "BW8085—Bendix Intellipark Electronic Parking Brake," Advertisement, Nov. 2019, 4 pages, Bendix Commercial Vehicle Systems LLC, Elyria Ohio U.S.A.

* cited by examiner

*Primary Examiner* — Michael J Zanelli
(74) *Attorney, Agent, or Firm* — Cheryl L. Greenly; Brian E. Kondas; Eugene E. Clair

(57) ABSTRACT

A parking brake controller comprises at least one input for receiving a signal indicative of at least one vehicle factor, a control input for receiving a request to unpark the vehicle, an output for transmitting a control signal to a parking brake valve and control logic. The control logic determines the at least one vehicle factor indicates the vehicle can be unparked, determines an unpark request has been received, and transmits a control signal to the parking brake valve only in response to the unpark request being received while the at least one vehicle factor is being met.

8 Claims, 2 Drawing Sheets

PARKING BRAKE APPARATUS FOR A VEHICLE

BACKGROUND

The present application relates to vehicle parking systems and is particularly directed to a parking brake apparatus for an air braked commercial vehicle, such as a tractor.

Commercial vehicles are different from passenger vehicles in that the transmission of a tractor does not typically have its own "Park" setting. Therefore, vehicle parking systems for tractors are based on braking systems in addition to the service braking system. One type of vehicle parking system for tractors is an electronic parking system. In some electronic parking systems, the parking brake cannot be released unless a vehicle factor is met. For example, the parking brake cannot be released unless the vehicle driver is detected to be in the driver's seat. In some other electronic parking systems, the parking brake cannot be released unless a multiple number of vehicle factors are met. Accordingly, those skilled in the art continue with research and development efforts in the field of commercial vehicle parking systems including electronic parking systems in which the parking brake cannot be inadvertently released.

SUMMARY

In accordance with one embodiment, a parking brake controller comprises at least one input for receiving a signal indicative of at least one vehicle factor, a control input for receiving a request to unpark the vehicle, an output for transmitting a control signal to a parking brake valve and control logic. The control logic determines the at least one vehicle factor indicates the vehicle can be unparked, determines an unpark request has been received, and transmits a control signal to the parking brake valve only in response to the unpark request being received while the at least one vehicle factor is being met.

In accordance with another embodiment, a method of unparking an air braked vehicle comprises receiving an indication that at least one vehicle factor has been met, receiving a request to unpark the vehicle and transmitting a control signal to a parking brake apparatus in response to the unpark request being received after the at least one vehicle factor is met.

DETAILED DESCRIPTION

The present application is directed to a parking brake apparatus for an air braked vehicle such as a truck. The specific construction of the parking brake apparatus may vary. It is to be understood that the disclosure below provides a number of embodiments or examples for implementing different features of various embodiments. Specific examples of components and arrangements are described to simplify the present disclosure. These are merely examples and are not intended to be limiting.

Figure 1:
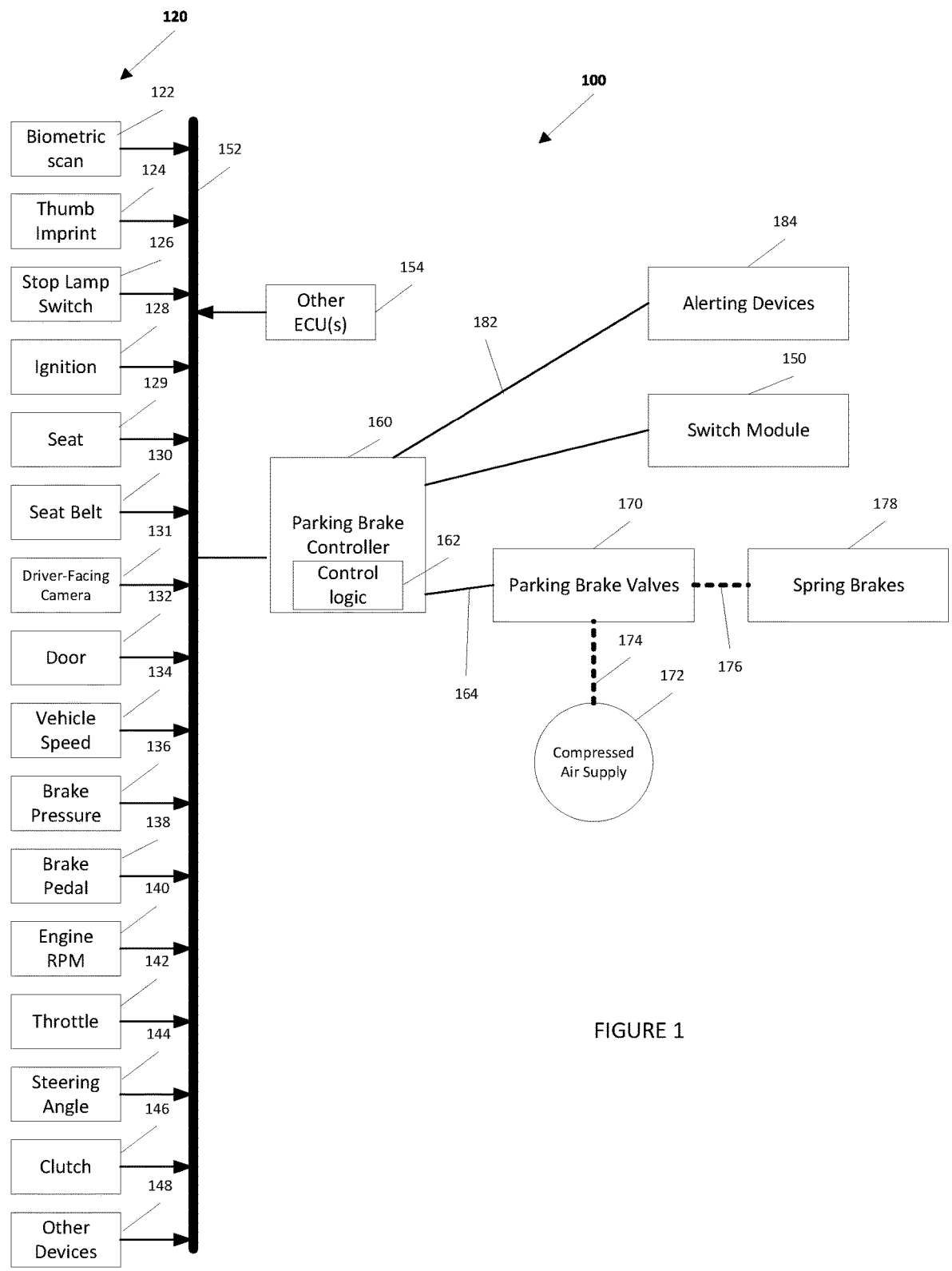
FIG. 1 is a schematic block diagram showing an example parking brake apparatus constructed in accordance with an embodiment.

Referring to FIG. 1, a schematic block diagram showing an example parking brake apparatus constructed in accordance with an embodiment is illustrated.

Parking brake apparatus 100 includes a number of vehicle factor devices 120 that provide a plurality of output signals indicative of a corresponding plurality of vehicle factors. More specifically, the devices 120 include but are not limited to a facial biometric scanner 122, a thumb imprint scanner 124, a stop lamp switch 126, an ignition switch 128, a seat switch 129, a vehicle seat belt switch 130, a driver-facing camera 131, a vehicle door switch 132, a vehicle speed sensor 134, a brake pressure sensor 136, a brake pedal sensor 138, an engine RPM sensor 140, a throttle position sensor 142, a steering angle sensor 144, a clutch position sensor 146, and other devices 148.

Each output signal from the devices 120 is indicative of a corresponding vehicle factor. In particular, the output signal from the facial biometric scanner 122 is indicative of validity of the identity of the vehicle driver based upon a scan of the driver's eyes or entire face. The output signal from the thumb imprint scanner 124 is indicative of validity of the identity of the vehicle driver based upon a scan of the driver's thumb print. The output signal from the stop lamp switch 126 is indicative of whether the pressure is being provided to the service brake circuit. The output signal from the ignition switch 128 is indicative of whether the ignition is on.

The output from the vehicle seat switch 129 is indicative of whether the vehicle driver's seat is occupied. The output signal from the vehicle seat belt switch 130 is indicative of whether the vehicle driver's seat belt is buckled. The output signal from the driver-facing camera 131 is indicative of validity of the identity of the vehicle driver based upon a captured camera image of the driver. The output signal from the vehicle door switch 132 is indicative of whether the vehicle driver's door is closed. The output signal from the vehicle speed sensor 134 is indicative of ground speed of the vehicle. The output signal from the brake pressure switch 136 is indicative of whether pressure is being provide via the foot brake pedal. The output signal from the brake pedal sensor 138 is indicative of the position of the foot brake pedal.

The output signal from the engine RPM sensor 140 is indicative of the revolutions per minute of the vehicle engine. The output signal from the throttle position sensor 142 is indicative of the position of the foot accelerator pedal. The output signal from the steering angle sensor 144 is indicative of the angle to which the vehicle steering wheel is being turned. The output signal from the clutch position sensor 146 is indicative of the position of the foot operated clutch. The output signals from the other devices 148 are from other sources associated with the status of the vehicle and/or driver.

The parking brake apparatus 100 includes other Electronic Control Unit(s) (ECU(s)) 154. Other ECUs 154 may include an autonomous or semi-autonomous driving ECU, for example. These ECUs may indicate that the vehicle is able to be unparked through diagnostic measures of connected valves and components.

The parking brake apparatus 100 includes a switch module 150. The output signal from the switch module 150 is indicative of driver intent to change the parking status of the vehicle. In one example, the driver will make his request to unpark the vehicle by pushing a parking brake switch on the switch module 150. Alternatively, the intent to change the parking status may be transmitted by the other ECU(s) 154 on the vehicle.

Parking brake apparatus 100 also includes a parking brake controller 160 in the form of an electronic control unit having at least one input arranged to monitor the output signals from the devices 120 indicative of the plurality of vehicle factors. These output signals may be communicated directly to the parking brake controller 160, via a vehicle serial communications bus 152, or a combination of both. The parking brake controller 160 provides one or more control signals based upon control logic 162 that is stored in a data storage unit of the parking brake controller 160. The control logic 162 may also include a timer.

The parking brake controller 160 includes at least one output to provide signals on line 164 to control operation of parking brake valves 170. Compressed air supply 172 provides a source of compressed air in line 174 to parking brake valves 170. Parking brake valves 170 are controlled by parking brake controller 160 to vary pneumatic pressure in line 176 to one or more spring brakes 178.

More specifically, when the parking brakes of the vehicle are to be released, the parking brake controller 160 provides signals on line 164 that are applied to parking brake valves 170 so as to provide compressed air to one or more chambers of spring brakes 178. When air is applied to the spring brakes 178, the spring holding the drum or disc brake assembly in the applied state is released, as is known. Structure and operation of the parking brake valves 170 for controlling operation of spring brakes 178 of the vehicle are conventional and, therefore, will not be further described.

Parking brake controller 160 also provides a number of signals on line 182 to alerting devices 184. Alternatively, the signals may be provided via the vehicle communication bus 152. The alerting devices 184 may be audio or visual alerting devices, or a combination of both. Other types of devices for alerting the vehicle driver are possible. For example, haptic devices may be used to alert the vehicle driver.

In accordance with an aspect of the present disclosure, the control logic 162 of the parking brake controller 160 monitors the output signals indicative of the at least one vehicle factor from the devices 120 and provides one or more control signals to be applied to components of the parking brake system to release the parking brakes based upon a valid sequence of the plurality of vehicle factors having been met and then receiving a request to unpark the vehicle.

A valid sequence may comprise a predefined sequence of events indicating that the vehicle is in a mode ready for driving/operation by an authorized user. Alternatively, or in addition to, a valid sequence may comprise a single or a number of discrete vehicle inputs indicating that the vehicle is in a mode ready for driving/operation by an authorized user.

A vehicle sequence can be monitored through the other ECUs 154 for determining whether the vehicle is ready to be moved. For example, if an anti-lock braking system (ABS) ECU and a vehicle engine ECU are transmitting output signals to the vehicle communications bus 152, the control logic 162 can determine that the vehicle is active. Alternatively, the ignition input may be used to determine a valid vehicle sequence.

A valid sequence may comprise a predefined sequence of events indicating that the vehicle parking brakes are ready to be released (either automatically or by the vehicle driver). The sequence and requirements of the vehicle factors to be met may be predefined by the original equipment manufacturer in the control logic 162 or defined by the driver or fleet manager through a separate programming operation of the parking brake controller 160.

In some embodiments, the parking brake controller 160 is arranged to provide an alert to a driver of the vehicle when the parking brakes are applied and when the parking brakes are released.

In some embodiments, the parking brake controller 160 is arranged to release the parking brakes when a combination of two predefined sequences of the plurality of vehicle factors occurs. The release will only occur when the predefined sequences occur and then the driver makes a request to release the parking brakes.

Therefore, a parking brake controller comprises at least one input for receiving a signal indicative of at least one vehicle factor, a control input for receiving a request to unpark the vehicle, an output for transmitting a control signal to a parking brake valve and control logic. The control logic determines the at least one vehicle factor indicates the vehicle can be unparked, determines an unpark request has been received, and transmits a control signal to the parking brake valve only in response to the unpark request being received while the at least one vehicle factor is being met.

Figure 2:
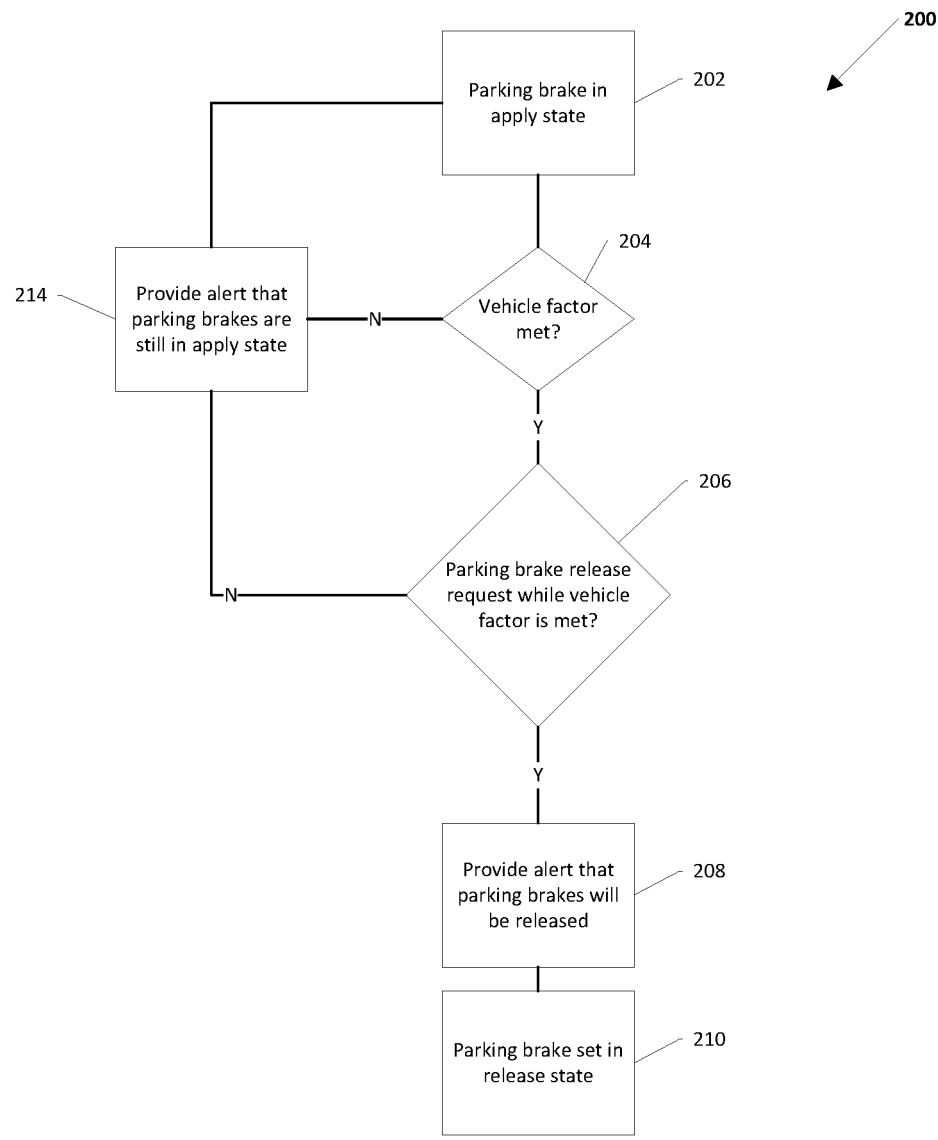
FIG. 2 is a flow diagram depicting an example method of operating the parking brake apparatus of FIG. 1.

Referring to FIG. 2, a method 200 of operating the parking brake apparatus 100 of FIG. 1 in accordance with an embodiment is illustrated.

In step 202, the parking brake is in an apply state, meaning the spring brakes 178 are set to prevent vehicle movement.

In step 204, the control logic 162 determines if a combination of vehicles factors, or interlocks, are met. As an example, the combination of vehicle factors may comprise only one vehicle factor, such as whether the vehicle ignition 128 is on. As another example, the combination of vehicle factors may comprise multiple vehicle factors, such as whether the vehicle ignition 128 is on and the stop light switch 126 is on.

The vehicle factors may be indicative of whether a driver is in the vehicle driver's seat. As an example, a determination may be made as to whether the captured image from the driver-facing camera 131 indicates a valid driver. Alternatively, or in addition to, a determination may be made as to whether the stop light switch 126 is on, the seat belt 130 is buckled, or the vehicle door 132 is closed. The vehicle factors that must be met may be set by the vehicle operator, the fleet manager or may be preset by the original equipment manufacturer. These are only example combinations of vehicle factors. Other combinations of vehicle factors are possible.

If any single one or a combination of the identified vehicle factors is not met, meaning for example that the vehicle ignition 128 is not on and the seat belt 130 is not buckled, the method 200 continues to step 214. In step 214, the driver is alerted through alerting device 184 that the parking brakes will remain in the apply state. The method 200 then returns to step 202.

If the combination of vehicle factors is met, meaning for example that the brake pedal sensor 138 indicates that the driver has his foot on the brake and the door switch 132 indicates that the driver's door is closed, the method 200 proceeds to step 206.

In step 206, the control logic 162 determines if the driver or another controller has requested a parking brake release. The driver may use a switch in the dash connected to the switch module 150 to indicate his desire to release the parking brakes. Another ECU 154, such as a semi-autonomous vehicle controller, may transmit a signal on the vehicle communications bus 152 regarding release of the parking brakes. For example, an autonomous controller will request parking brakes to be released when the autonomous controller has assumed control of the vehicle and is preparing for the vehicle to move. If no parking brake release request is received by the control logic 162, the method 200 will continue to step 214 to indicate an alert via the alerting device 184 that the parking brakes are still in the apply state. The method 200 will return to step 202 where the parking brakes remain in the apply state.

A timing factor may be used with respect to the parking brake request to ensure that the driver is truly trying to release the parking brakes rather than vibration causing the switch to create an instantaneous signal. For example, the parking brake request may need to be maintained for at least 0.5 seconds for the signal to be considered a valid signal.

If the parking brake release request is received by the control logic 162, and the vehicle factor as in step 204 is still being met, the method continues to step 208. The parking brake release request must be received after the interlock or combination of interlocks are met. If the parking brake release request is received before the interlocks are met, rejection of the parking brake release request and a corresponding notification to the driver through the alerting devices 184 will occur.

In step 208 the control logic 162 will transmit an alert on the alerting device 184 that the parking brakes will be released. In step 210 the parking brakes are released. The control logic 162 releases the parking brakes by transmitting a control signal to the parking brake valves 170, which then transmit air to the spring brakes 178 to release the parking brakes.

If the parking brakes are not released, the driver can re-initiate the method 200 simply by satisfying all of the vehicle factors and then indicating his desire to release the parking brakes.

Therefore, a method of unparking an air braked vehicle comprises receiving an indication that at least one vehicle factor has been met, receiving a request to unpark the vehicle and transmitting a control signal to a parking brake apparatus in response to the unpark request being received after the at least one vehicle factor is met.

In another example, the control logic 162 may determine if a predetermined time has elapsed since the combination of vehicle factors have been met and the park brake release request was received. In one example the predetermined time is between 0.10 seconds and 5 seconds. The purpose of the time limit is to ensure that the proper order of events occurs in a timely manner. If the actual time elapsed between the interlock and the parking brake release request is greater than the predetermined time, the method 200 would proceed to step 214 to indicate to the driver via the alerting device 184 that the parking brakes are still in the apply state. In another example, the parking release request is acted upon as long as the parking brake release request occurs after the vehicle factor is met.

It should be apparent that the above-described parking brake apparatus 100 provides a parking brake system in which the parking brakes are released based upon occurrence of at least one of the plurality of vehicle factors occurring prior to a request for the parking brakes to be released and within a set time period. The driver is thus trained to satisfy all of the interlocks first and then indicate his desire to release the parking brakes. The plurality of vehicle factors are selected from facial biometric scan status, thumb imprint scan status, stop lamp switch status, key ignition switch status, seat occupancy status, seat belt status, driver-facing camera status, door status, vehicle speed status, brake pressure switch status, engine RPM status, throttle position status, steering angle status and clutch position status.

The above vehicle factors are only example vehicle factors. Other vehicle factors are possible. As an example, a lateral acceleration device providing an output signal indicative of vehicle yaw or a longitudinal acceleration device providing an output signal indicative of vehicle pitch may be used as vehicle factors. Any combination of devices may be used.

It should further be apparent that the above-described parking apparatus provides a parking brake system in which the release of the parking brakes is based upon satisfaction of at least one vehicle interlock, and not based upon a requirement that all of the vehicle interlocks be satisfied. By providing a parking brake system in which the release of the parking brakes is based upon the vehicle interlock being satisfied prior to the request for the parking brake to be released, potential vehicle downtime can be avoided. Also, accidental release of the parking brakes can be avoided.

Program instructions for enabling the parking brake controller 160 to perform operation steps in accordance with method 200, may be embedded in memory internal to parking brake controller 160. Alternatively, or in addition to, program instructions may be stored in memory external to parking brake controller 160. As an example, program instructions may be stored in memory internal to a different electronic controller 154 of the vehicle or in the switch module 150. Program instructions may be stored on any type of program storage media including, but not limited to, external hard drives, flash drives, and compact discs. Program instructions may be reprogrammed depending upon features of the particular electronic controller.

Aspects of disclosed embodiments may be implemented in software, hardware, firmware, or a combination thereof. The various elements of the system, either individually or in combination, may be implemented as a computer program product tangibly embodied in a machine-readable storage device for execution by a processor. Various steps of embodiments may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed embodiments can be loaded onto a computer.

Although the above description describes use of one electronic controller unit, it is conceivable that any number of electronic controller units may be used. Moreover, it is conceivable that any type of electronic controller unit may be used. Suitable electronic controller units for use in vehicles are known and, therefore, have not been described. Accordingly, the program instructions of the present disclosure can be stored on program storage media associated with one or more vehicle electronic controller units.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A parking brake controller for an air braked vehicle having a parking brake apparatus comprising:
    at least one input for receiving a signal indicative of at least one vehicle factor;
    a control input for receiving a request to unpark the vehicle;
    an output for transmitting a control signal to a parking brake valve; and
    control logic that
        determines the at least one vehicle factor indicates the vehicle can be unparked,
        determines an unpark request has been received, and
        transmits a control signal to the parking brake valve only in response to the unpark request being received within a predetermined time after receiving the indication that the at least one vehicle factor indicating that the vehicle can be unparked is still being met.

2. The parking brake controller as in claim 1, wherein the control logic alerts a driver of the vehicle that the vehicle is being unparked when the control signal is transmitted.

3. The parking brake controller as in claim 1, wherein the at least one vehicle factor indicating that the vehicle can be unparked is selected from a facial biometric scan identifying a valid driver, a thumb imprint scan identifying a valid driver, a stop lamp switch indicating the service brakes are actuated, a key ignition switch indicating the ignition is on, a seat occupancy indicating the driver is in his seat, a seat belt switch indicating the driver has fastened his seat belt, a driver-facing camera indicating a valid driver, a door switch indicating the driver's door is closed, a vehicle speed indicating the vehicle is stationary, a brake pressure switch indicating the service brakes are actuated, an engine RPM indicating the engine is in idle, a throttle position indicating the driver's foot is not on the throttle, a steering angle indicating the driver is not turning the steering wheel, a clutch position indicating the vehicle clutch is not engaged, and another electronic controller indicating that the vehicle is able to be unparked.

4. The parking brake controller as in claim 3, wherein the at least one vehicle factor is a predetermined combination of vehicle factors.

5. A method of unparking an air braked vehicle comprising:
    receiving an indication that at least one vehicle factor has been met;
    receiving a request to unpark the vehicle; and
    transmitting a control signal to a parking brake apparatus in response to the unpark request being received within a predetermined time after the indication that the at least one vehicle factor is still being met.

6. The method as in claim 5, further comprising alerting a driver of the vehicle that the vehicle is being unparked.

7. The method as in claim 5, wherein the at least one vehicle factor being met is selected from a facial biometric scan identifying a valid driver, a thumb imprint scan identifying a valid driver, a stop lamp switch indicating the service brakes are actuated, a key ignition switch indicating the ignition is on, a seat occupancy indicating the driver is in his seat, a seat belt switch indicating the driver has fastened his seat belt, a driver-facing camera indicating a valid driver, a door switch indicating the driver's door is closed, a vehicle speed indicating the vehicle is stationary, a brake pressure switch indicating the service brakes are actuated, an engine RPM indicating the engine is in idle, a throttle position indicating the driver's foot is not on the throttle, a steering angle indicating the driver is not turning the steering wheel, a clutch position indicating the vehicle clutch is not engaged, and another electronic controller indicating that the vehicle is able to be unparked.

8. The method as in claim 5, wherein the at least one vehicle factor is a predetermined combination of vehicle factors.

\* \* \* \* \*